(12) United States Patent
Masumura et al.

(10) Patent No.: US 12,424,237 B2
(45) Date of Patent: *Sep. 23, 2025

(54) TAG ESTIMATION DEVICE, TAG ESTIMATION METHOD, AND PROGRAM

(71) Applicant: NIPPON TELEGRAPH AND TELEPHONE CORPORATION, Tokyo (JP)

(72) Inventors: Ryo Masumura, Tokyo (JP); Tomohiro Tanaka, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/657,584

(22) Filed: May 7, 2024

(65) Prior Publication Data

US 2024/0290344 A1 Aug. 29, 2024

Related U.S. Application Data

(63) Continuation of application No. 17/279,009, filed as application No. PCT/JP2019/036005 on Sep. 13, 2019, now Pat. No. 12,002,486.

(30) Foreign Application Priority Data

Sep. 26, 2018 (JP) ................. 2018-180018

(51) Int. Cl.
*G10L 25/30* (2013.01)
*G10L 15/02* (2006.01)
(Continued)

(52) U.S. Cl.
CPC .............. *G10L 25/30* (2013.01); *G10L 15/02* (2013.01); *G10L 15/10* (2013.01); *G10L 25/48* (2013.01)

(58) Field of Classification Search
CPC ......... G10L 17/00; G10L 15/26; G10L 17/04; G10L 17/06; G10L 25/63; G10L 25/51
See application file for complete search history.

(56) References Cited

U.S. PATENT DOCUMENTS 10,482,885 B1 * 11/2019 Moniz .................... G06F 3/167
2014/0222423 A1 * 8/2014 Cumani .................. G10L 17/02
704/236
(Continued)

FOREIGN PATENT DOCUMENTS

JP 2016-018229 A 2/2016
JP 2017-228160 A 12/2017

OTHER PUBLICATIONS

Tsunoo et al. (2017) "Hierarchical recurrent neural network for story segmentation," In Proc. Annual Conference of the International Speech Communication Association (Interspeech), Aug. 20-24, 2017, Stockholm, Sweden, pp. 2919-2923.
(Continued)

*Primary Examiner* — Mark Villena

(57) ABSTRACT

A tag estimation device capable of estimating, for an utterance made among several persons, a tag representing a result of analyzing the utterance is provided. The tag estimation device includes an utterance sequence information vector generation unit that adds a t-th utterance word feature vector and a t-th speaker vector to a (t-1)-th utterance sequence information vector $u_{t-1}$ that includes an utterance word feature vector that precedes the t-th utterance word feature vector and a speaker vector that precedes the t-th speaker vector to generate a t-th utterance sequence information vector $u_t$, where t is a natural number, and a tagging unit that determines a tag $l_t$ that represents a result of analyzing a t-th utterance from a model parameter set in advance and the t-th utterance sequence information vector $u_t$.

9 Claims, 9 Drawing Sheets

(51) Int. Cl.
*G10L 15/10* (2006.01)
*G10L 25/48* (2013.01)

(56) References Cited

U.S. PATENT DOCUMENTS

| | | | |
|---|---|---|---|
| 2015/0058019 A1* | 2/2015 | Chen | G10L 13/08 |
| | | | 704/260 |
| 2017/0084295 A1* | 3/2017 | Tsiartas | G10L 17/08 |
| 2017/0372694 A1 | 12/2017 | Ushio | |
| 2018/0046710 A1* | 2/2018 | Raanani | G10L 15/183 |
| 2018/0308487 A1* | 10/2018 | Goel | G10L 15/1815 |
| 2019/0065464 A1* | 2/2019 | Finley | G06N 3/044 |
| 2019/0279644 A1* | 9/2019 | Yamamoto | G10L 17/12 |
| 2020/0211567 A1* | 7/2020 | Wang | G06N 7/01 |
| 2022/0036912 A1 | 2/2022 | Masumura et al. | |

OTHER PUBLICATIONS

India et al. (2017) "LSTM Neural Network-Based Speaker Segmentation Using Acoustic and Language Modelling" Interspeech 2017: Aug. 20-24, 2017: Stockholm. International Speech Communication Association (ISCA).

Masumura et al. (2017) "Online End-of-Turn Detection from Speech Based on Stacked Time-Asynchronous Sequential Networks" Interspeech. vol. 2017.

\* cited by examiner

FIG.1

```
                                                              TAG l_t OF t-TH
                                                              UTTERANCE
                                                                  ↑
                                                          ┌──────────────┐
                                                          │ TAGGING UNIT │──114
                                                          └──────────────┘
                                                                  ↑
SPEAKER LABEL OF        ┌──────────────┐                          │
t-TH UTTERANCE ──────→  │SPEAKER VECTOR│──112                     │
                        │TRANSFORM UNIT│                          │
                        └──────────────┘                          │
                               │   SPEAKER VECTOR r_t             │
                               │   OF t-TH UTTERANCE              │
                               ↓                                  │
                        ┌──────────────────┐   UTTERANCE SEQUENCE INFORMATION
                        │UTTERANCE SEQUENCE│   VECTOR u_t IN WHICH FIRST TO t-TH
                        │INFORMATION VECTOR│──113  UTTERANCE WORD FEATURE
                        │  GENERATION UNIT │   VECTORS AND FIRST TO t-TH SPEAKER
                        └──────────────────┘   VECTORS ARE EMBEDDED
                               ↑  │                      ┌──────────┐
                               │  └─────────────────────→│  VECTOR  │
                               │                         │ STORAGE  │──113A
                               │                         │   UNIT   │
                               │                         └──────────┘
                        ┌──────────────┐
WORD SEQUENCE OF        │ UTTERANCE    │
t-TH UTTERANCE ──────→  │ WORD FEATURE │──111
                        │VECTOR        │
                        │TRANSFORM UNIT│
                        └──────────────┘
                               UTTERANCE WORD
                               FEATURE VECTOR w_t OF
                               t-TH UTTERANCE

UTTERANCE SEQUENCE
          INFORMATION VECTOR u_{t-1}
          IN WHICH UTTERANCE
          WORD FEATURE VECTORS
          PRECEDING t-TH
          UTTERANCE WORD
          FEATURE VECTOR AND
          SPEAKER VECTORS
          PRECEDING t-TH SPEAKER
          VECTOR ARE EMBEDDED

VOICE OF t-TH UTTERANCE → UTTERANCE CONTENT VECTOR CONSTRUCTION UNIT (311) → UTTERANCE WORD FEATURE VECTOR $w_t$ OF t-TH UTTERANCE

SPEAKER LABEL OF t-TH UTTERANCE → SPEAKER VECTOR TRANSFORM UNIT (112) → SPEAKER VECTOR $r_t$ OF t-TH UTTERANCE

→ UTTERANCE SEQUENCE INFORMATION VECTOR GENERATION UNIT (113) → UTTERANCE SEQUENCE INFORMATION VECTOR $u_t$ IN WHICH FIRST TO t-TH UTTERANCE WORD FEATURE VECTORS AND FIRST TO t-TH SPEAKER VECTORS ARE EMBEDDED

→ VECTOR STORAGE UNIT (113A)

UTTERANCE SEQUENCE INFORMATION VECTOR $u_{t-1}$ IN WHICH UTTERANCE WORD FEATURE VECTORS PRECEDING t-TH UTTERANCE WORD FEATURE VECTOR AND SPEAKER VECTORS PRECEDING t-TH SPEAKER VECTOR ARE EMBEDDED

→ TAGGING UNIT (114) → TAG $l_t$ OF t-TH UTTERANCE

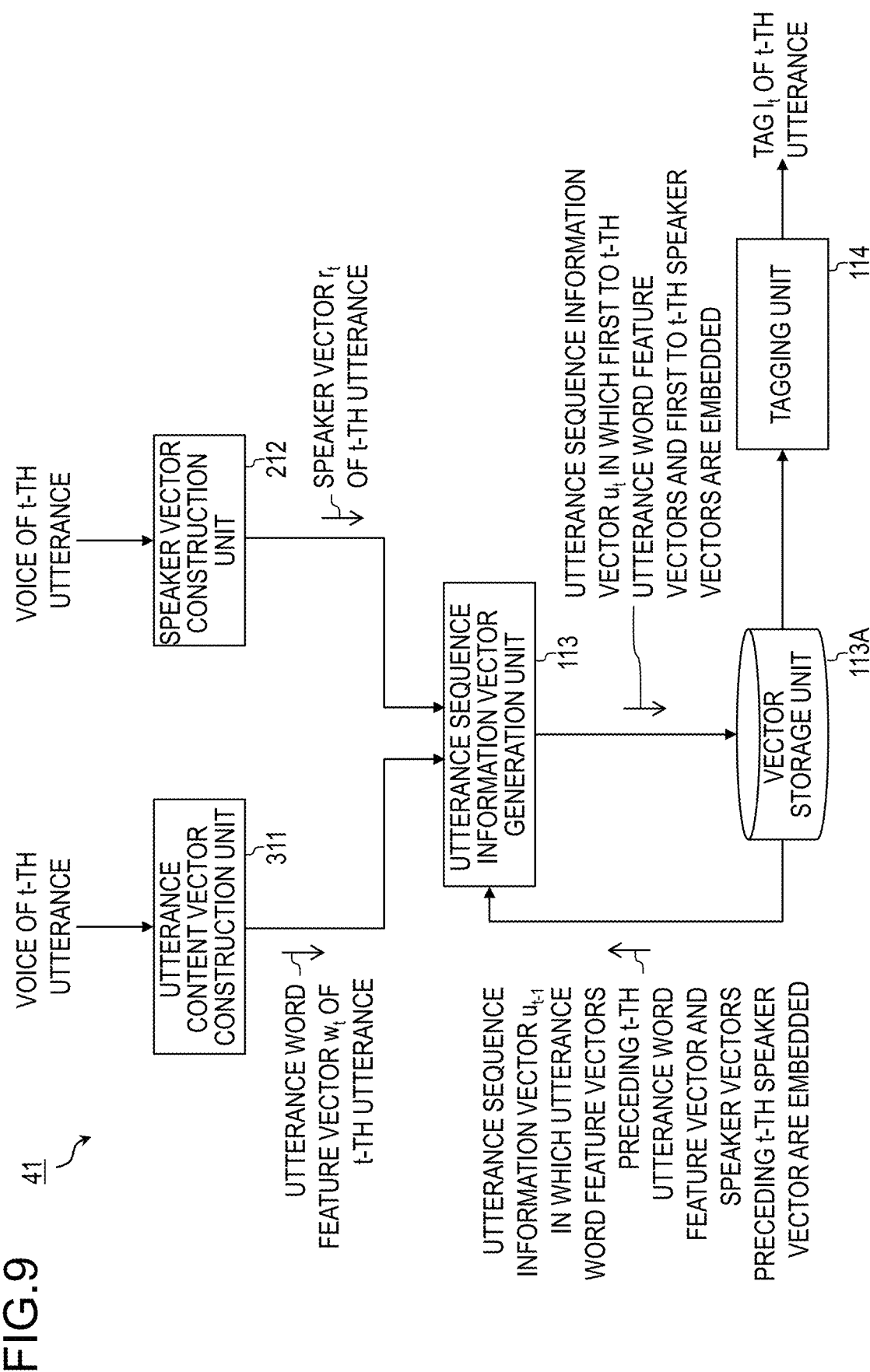

TAG ESTIMATION DEVICE, TAG ESTIMATION METHOD, AND PROGRAM

CROSS-REFERENCE TO RELATED APPLICATIONS

This application is a continuation application of U.S. patent application Ser. No. 17/279,009, filed on Mar. 23, 2021, which application is a U.S. 371 Application of International Patent Application No. PCT/JP2019/036005, filed on 13 Sep. 2019, which application claims priority to and the benefit of JP Application No. 2018-180018, filed on 26 Sep. 2018, the disclosures of which are hereby incorporated herein by reference in their entireties.

TECHNICAL FIELD

The present invention relates to a tag estimation device, a tag estimation method, and a program for estimating, for an utterance made between multiple persons, such as a dialogue between an operator and a customer at a call center, a tag representing a result of analyzing the utterance.

BACKGROUND ART

A technique for extracting information from, for example, a dialogue between an operator and a customer at a call center and putting the information to business use has attracted attention in recent years. For example, in the aforementioned case of a dialogue at a call center, a customer's complaint and requirement are extracted from a dialogue between an operator and the customer, which makes it possible to describe countermeasures against frequent complaints on a Web page and present the countermeasures to the operator during a call. A technique for successively providing information which helps an operator in dealing on the basis of information in a dialogue between the operator and a customer has also attracted attention. For example, it is also possible to reduce a work burden on an operator by extracting a customer's personal information (e.g., a name, an address, and a phone number) from a dialogue between the operator and the customer and automatically registering the personal information in a database. For implementation of the above-described techniques, there is demand for a technique for automatically identifying, from a dialogue between multiple persons, a present status. For example, in the aforementioned case of a dialogue at a call center, a technique for identifying a scene, such as an opening or closing scene, a scene of confirmation of customer information, or a scene of elicitation of a customer's requirement, is required. A technique for attaching a tag for scene identification to a dialogue between multiple persons is called multiple persons dialogue scene tagging.

Methods that exhibit high performance among conventional techniques for scene tagging on voice data include a method using a recurrent neural network (e.g., Non-Patent Literature 1). In Non-Patent Literature 1, voice recognition is performed on each utterance, and a feature quantity is extracted from a word sequence of the utterance, and which scene the utterance corresponds to is identified. A recurrent neural network is used at this time. At the time of scene determination for a current utterance, utterances up to this point are also used as a context at the time of scene determination.

CITATION LIST

Non-Patent Literature

Non-Patent Literature 1: E. Tsunoo, P. Bell, and S. Renals, "Hierarchical Recurrent Neural Network for Story Segmentation," In Proc. Annual Conference of the International Speech Communication Association (INTERSPEECH), pp. 2919-2923, 2017.

SUMMARY OF THE INVENTION

Technical Problem

The technique according to Non-Patent Literature 1 is intended for information of a single speaker and is not configured to accept information on a speaker. That is, even in a case where a dialogue, for example, at a call center in which multiple speakers participate is tagged, a voice in question needs to be regarded as a voice of a single speaker. Since tagging in Non-Patent Literature 1 is not a technique designed with multiple speakers in mind, if a dialogue made between multiple speakers is a target of tagging, information about who is currently speaking (the role of a currently speaking person) cannot be explicitly used. However, when tagging is to be performed on a dialogue between multiple speakers, refined tagging cannot be performed if details leading up to information about who is speaking cannot be used as a context.

For example, information about whether a current utterance and an immediately preceding utterance are utterances of the same speaker alone can be important information for tagging. For example, if utterances of the same speaker are made in succession, the same scene is continuing in many cases. If switching to an utterance of a different speaker occurs, the utterance is potentially an utterance which is a response to an immediately preceding utterance or an utterance for a significant change in topic.

Not only tags for scene identification but also tags for identification of an utterance type representing rough content of an utterance, emotions of an utterer, an interrogative/declarative intention (paralinguistic information) of the utterance, and the like are important. The technique according to Non-Patent Literature 1, however, suffers from the problem of the incapability of setting a tag other than a tag for scene identification.

Under the circumstances, the present invention has an object to provide a tag estimation device capable of estimating, for an utterance made between multiple persons, a tag representing a result of analyzing the utterance.

Means for Solving the Problem

A tag estimation device according to the present invention includes an utterance sequence information vector generation unit and a tagging unit.

Letting t be a natural number, the utterance sequence information vector generation unit adds an utterance word feature vector of a t-th utterance and a speaker vector of the t-th utterance to a (t-1)-th utterance sequence information vector $u_{t-1}$ that includes an utterance word feature vector that precedes the t-th utterance word feature vector and a speaker vector that precedes the t-th speaker vector to generate a t-th utterance sequence information vector $u_t$. The tagging unit determines a tag $l_t$ that represents a result of analyzing the t-th utterance from a model parameter set in advance and the t-th utterance sequence information vector $u_t$.

Effects of the Invention

The tag estimation device according to the present invention can estimate, for an utterance made between multiple persons, a tag representing a result of analyzing the utterance.

BRIEF DESCRIPTION OF DRAWINGS

FIG. 1 is a block diagram showing a configuration of a tag estimation device according to a first embodiment.

FIG. 7 is a block diagram showing a configuration of a tag estimation device according to a third embodiment.

FIG. 9 is a block diagram showing a configuration of a tag estimation device according to a fourth embodiment.

DESCRIPTION OF EMBODIMENTS

Figure 2:
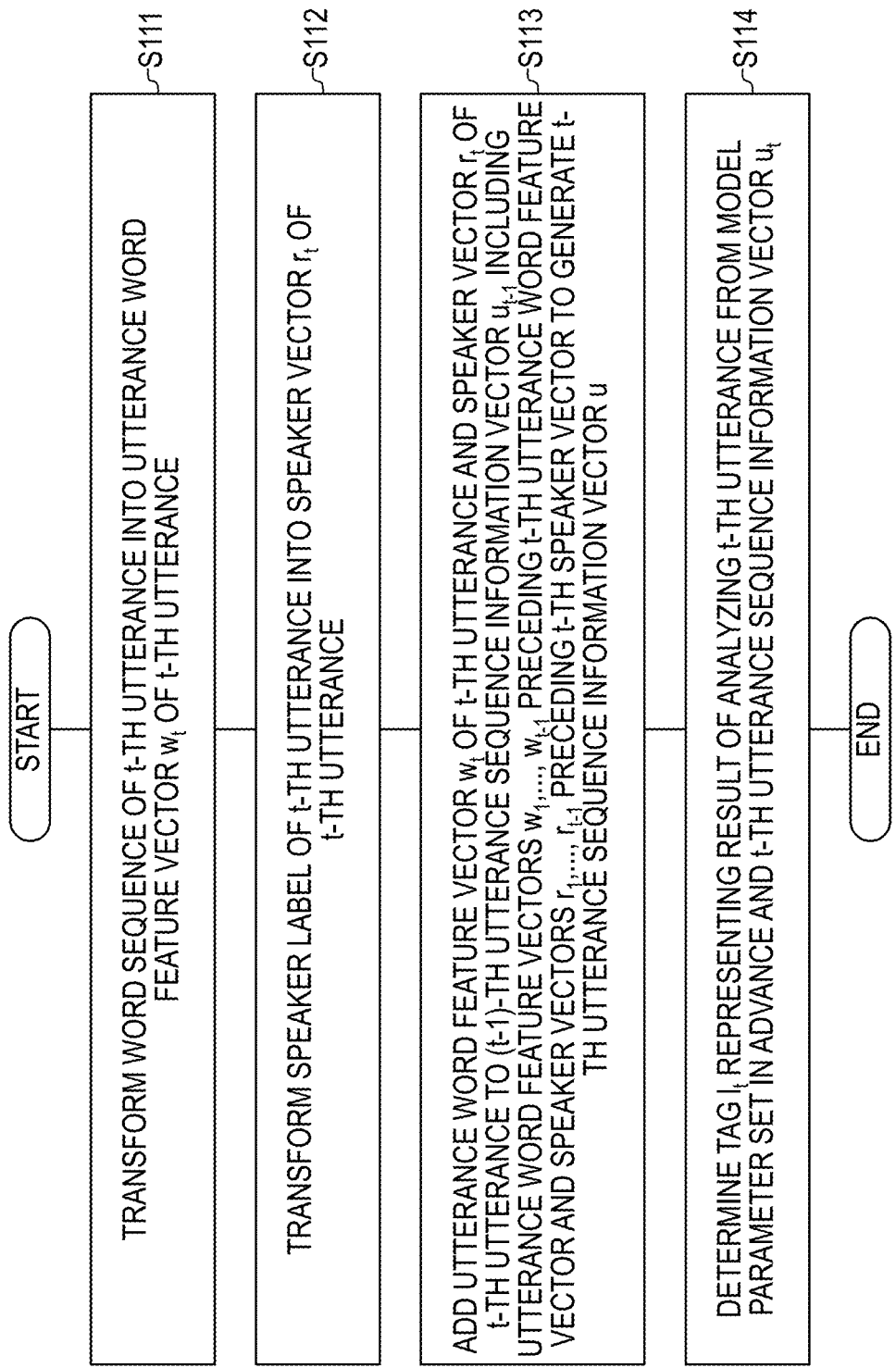
FIG. 2 is a flowchart showing operation of the tag estimation device according to the first embodiment.

Embodiments of the present invention will be described below in detail. Note that constitutional units having the same capabilities are denoted by the same reference numerals and that a redundant description thereof will be omitted.

First Embodiment

A configuration of a tag estimation device according to a first embodiment will be described below with reference to FIG. 1. As shown in FIG. 1, a tag estimation device 11 includes an utterance word feature vector transform unit 111, a speaker vector transform unit 112, an utterance sequence information vector generation unit 113, a vector storage unit 113A, and a tagging unit 114.

Note that a tag is any one among a group of tags including two or more tags determined in advance. For example, at the time of tagging a scene at a call center, a group of tags including five tags of "opening," "requirement grasping," "requirement addressing," "personal information grasping," and "closing" can be set. At the time of tagging a meeting scene, a group of tags including four tags of "opening," "subject raising," "debate," and "closing" can be set. In this case, a problem with tagging can be set as the problem of determining any one tag for each utterance.

Operation of the tag estimation device 11 according to the present embodiment will be described below with reference to FIG. 2. The flowchart in FIG. 2 shows a process on a t-th utterance in an utterance sequence. Assume that t is an arbitrary natural number. Assume that the utterance sequence includes two or more utterances and that the utterance sequence is in chronological order.

[Utterance Word Feature Vector Transform Unit 111]

Input: a word sequence of the t-th utterance

Output: an utterance word feature vector $w_t$ of the t-th utterance

Operation: The utterance word feature vector transform unit 111 transforms the word sequence of the t-th utterance into the utterance word feature vector $w_t$ of the t-th utterance (S111).

A word sequence of an utterance may be obtained by transforming the utterance into text using voice recognition or may be obtained by manually transcribing the utterance. Note that, if the utterance is not divided into words, the utterance may be transformed into a word sequence using, e.g., morphological analysis.

The utterance word feature vector transform unit 111 can express an utterance word feature vector in an arbitrary manner. For example, a word feature vector called Bag-of-Words or the like can be used. Note that since Bag-of-Words is a publicly known technique, a description thereof will be omitted. The utterance word feature vector transform unit 111 can also use a recurrent neural network in order to use an utterance word feature vector holding the order of words. A recurrent neural network has the capability of transforming a variable-length symbol sequence or vector sequence into a single vector. Recurrent neural networks include variants, such as a GRU and an LS™, and one having the same capabilities can be used. Note that, if a recurrent neural network is used, the utterance word feature vector transform unit 111 has a model parameter obtained through learning. A recurrent neural network is a publicly known technique, and a description thereof will be omitted.

[Speaker Vector Transform Unit 112]

Input: a speaker label of the t-th utterance

Output: a speaker vector $r_t$ of the t-th utterance

Operation: The speaker vector transform unit 112 transforms the speaker label of the t-th utterance into the speaker vector $r_t$ of the t-th utterance (S112).

The speaker vector transform unit 112 can use an arbitrary method as long as the method vectorizes speaker information. For example, the speaker vector transform unit 112 can use a one-hot vector in which only a dimension corresponding to a given speaker label is set at 1, and the other dimensions are set at 0. The speaker vector transform unit 112 may adopt a vector obtained by performing a linear transform or a non-linear transform on a one-hot vector as a speaker vector. Note that, if a linear transform or a non-linear transform is performed, the speaker vector transform unit 112 has a model parameter obtained through learning.

[Utterance Sequence Information Vector Generation Unit 113]

Input: the utterance word feature vector $w_t$ of the t-th utterance, the speaker vector $r_t$ of the t-th utterance, and an utterance sequence information vector $u_{t-1}$ in which utterance word feature vectors preceding the t-th utterance word feature vector and speaker vectors preceding the t-th speaker vector are embedded Output: an utterance sequence information vector $u_t$ in which first to t-th utterance word feature vectors and first to t-th speaker vectors are embedded Operation: The utterance sequence information vector generation unit 113 adds the utterance word feature vector $w_t$ of the t-th utterance and the speaker vector $r_t$ of the t-th utterance to the (t-1)-th utterance sequence information vector $u_{t-1}$ including utterance word feature vectors $w_1, \ldots, w_{t-1}$ preceding the t-th utterance word feature vector and speaker vectors $r_1, \ldots, r_{t-1}$ preceding the t-th speaker vector to generate the t-th utterance sequence information vector $u_t$ (S113).

That is, the utterance sequence information vector generation unit 113 recursively embeds pieces of utterance information up to the present. The utterance sequence information vector generation unit 113 first constructs a combined vector of a current utterance word feature vector and a speaker vector of a current utterance. A combined vector $c_t$ of the utterance word feature vector $w_t$ of the t-th utterance and the speaker vector $r_t$ of the t-th utterance is represented by the formula below.

$$c_t = [w_t^T, r_t^T]^T \quad \text{[Formula 1]}$$

In Formula 1, T is a symbol representing transposition of a vector. The combined vector $c_t$ and the utterance sequence information vector $u_{t-1}$, in which the preceding utterance word feature vectors and the preceding speaker vectors are embedded, are handled in a recurrent neural net. The use of the recurrent neural network makes it possible to construct the vector $u_t$, in which the utterance word feature vectors up to the present and the speaker vectors up to the present are embedded. That is, $u_t$ is constructed in accordance with the formula below.

$$u_t = RNN(c_t, u_{t-1}) \quad \text{[Formula 2]}$$

In Formula 2, RNN( ) is a function having capabilities of a recurrent neural network and includes a model parameter obtained through learning. Since a recurrent neural network is a publicly known technique, as described earlier, a description thereof will be omitted.

[Tagging Unit 114]

Input: the utterance sequence information vector $u_t$, in which the first to t-th utterance word feature vectors and the first to t-th speaker vectors are embedded Output: a tag $l_t$ of the t-th utterance Operation: The tagging unit 114 determines the tag $l_t$ representing a result of analyzing the t-th utterance from a model parameter set in advance and the t-th utterance sequence information vector $u_t$ (S114). A tag may be a tag for identification of a scene for a conversation or a tag for identification of an utterance type, emotions of an utterer, paralinguistic information, and the like. The tagging unit 114 may select and determine multiple types of ones from among the different types of tags.

The tagging unit 114 first generates a posterior probability vector $o_t$ corresponding to each label through a transform using a softmax function. That is, $o_t$ follows the formula below.

$$o_t = \text{SOFTMAX}(u_t) \quad \text{[Formula 3]}$$

In Formula 3, SOFTMAX( ) is a transform function using a softmax function and includes a model parameter obtained through learning. A softmax function is a publicly known technique. Each element of $o_t$ represents a probability of each tag, and a value $o_{t,k}$ for a k-th dimension represents a probability of a k-th tag. Note that of is a vector having two or more elements. Finally, the tag $l_t$ of the current utterance can be determined in accordance with the formula below.

$$l_t = \operatorname*{argmax}_{k} o_{t:k} \quad \text{[Formula 4]}$$

That is, the tagging unit 114 determines a tag corresponding to an element with a maximum probability.

<Model Parameter Learning Device 12>

Figure 3:
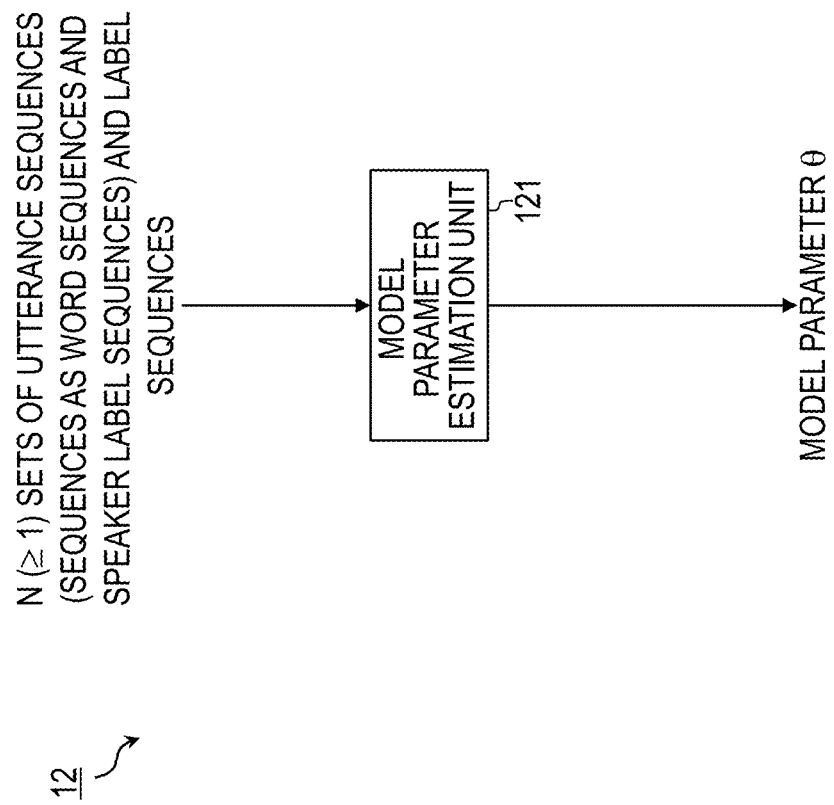
FIG. 3 is a block diagram showing a configuration of a model parameter learning device according to the first embodiment.
Figure 4:
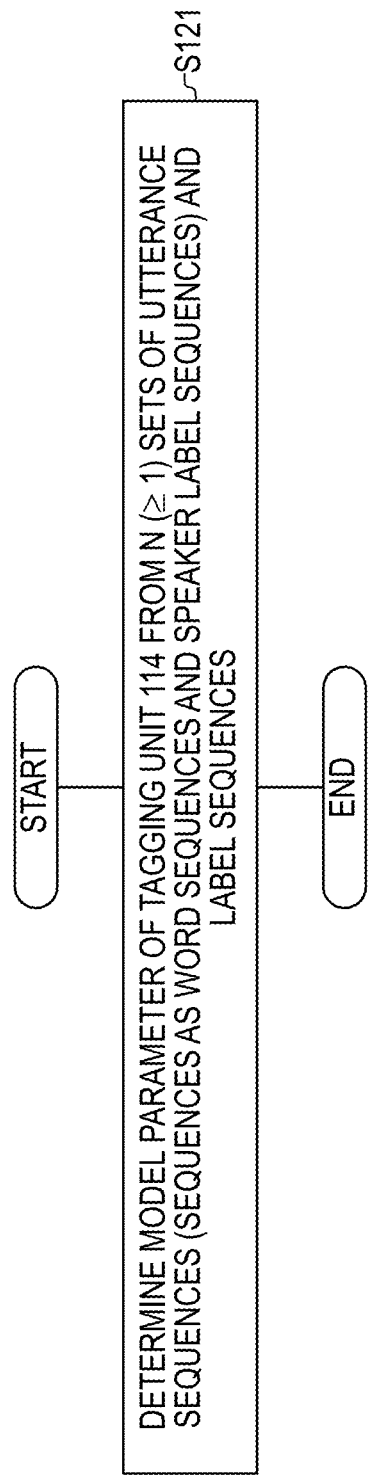
FIG. 4 is a flowchart showing operation of the model parameter learning device according to the first embodiment.

A configuration of a model parameter learning device according to the first embodiment will be described below with reference to FIG. 3. As shown in FIG. 3, a model parameter learning device 12 includes a model parameter estimation unit 121.

[Model Parameter Estimation Unit 121]

Input: N (≥1) sets of utterance sequences (sequences as word sequences and speaker label sequences) and sequences of labels which are right tags corresponding to the utterance sequences Output: a model parameter θ

Operation: The model parameter estimation unit 121 determines a model parameter of the tagging unit 114 from the N (≥1) sets of utterance sequences (sequences as word sequences and speaker label sequences) and label sequences (S121). Note that, if the utterance word feature vector transform unit 111, the speaker vector transform unit 112, and the utterance sequence information vector generation unit 113 each have a model parameter, the model parameters are also determined through learning in step S121.

Although detailed model parameters differ depending on the configurations of the utterance word feature vector transform unit 111, the speaker vector transform unit 112, the utterance sequence information vector generation unit 113, and the tagging unit 114, all the model parameters are denoted here by θ. Specifically, the model parameters are model parameters which recurrent neural networks of the utterance word feature vector transform unit 111 and the utterance sequence information vector generation unit 113 have, a model parameter used for a linear transform or a non-linear transform in the speaker vector transform unit 112, a model parameter which the softmax function of the tagging unit 114 has, and the like. Letting here a t-th utterance (a word sequence and a speaker label) of n-th voice data be $U_t^n$; and a t-th label, $l_t^n$, all the model parameters can be estimated in accordance with the learning criterion below.

$$\hat{\theta} = \operatorname*{argmax}_{\theta} \prod_{n=1}^{N} \prod_{t=1}^{T_n} P(l_t^n | U_t^u, \theta) \quad \text{[Formula 5]}$$

In Formula 5, $\hat{\theta}$ is an estimated model parameter, $T_n$ represents the number of utterances of the n-th voice data, and $P(l_t^n|U_t^n,\theta)$ represents a probability value of $l_t^n$ obtained in accordance with θ in a case where $U_t^n$ is given, and corresponds to a value of a corresponding element of $o_t$ described earlier if n is omitted. That is, the model parameter estimation unit 121 estimates the model parameter so as to achieve the best behavior for given data (such that a prediction probability is the highest).

Second Embodiment

Figure 5:
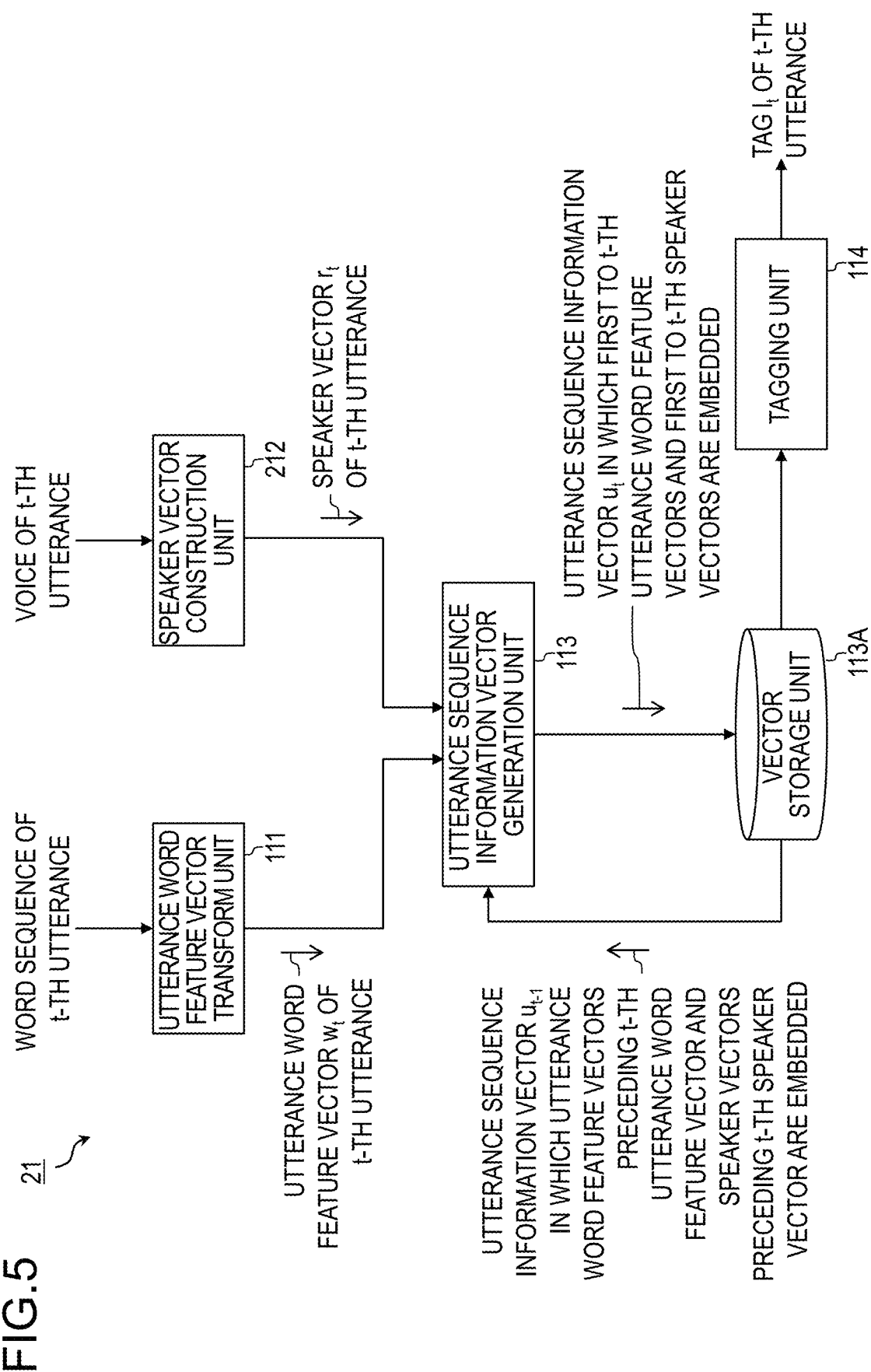
FIG. 5 is a block diagram showing a configuration of a tag estimation device according to a second embodiment.

A configuration of a tag estimation device according to a second embodiment using a speaker vector construction unit which directly constructs a vector representing information on a speaker from voice instead of the speaker vector transform unit described earlier will be described below with reference to FIG. 5. As shown in FIG. 5, a tag estimation device 21 includes an utterance word feature vector transform unit 111, a speaker vector construction unit 212, an utterance sequence information vector generation unit 113, a vector storage unit 113A, and a tagging unit 114 and is the same in configuration as in the first embodiment except for the speaker vector construction unit 212. The tag estimation device 21 according to the present embodiment can estimate a tag, as in the first embodiment, even if a speaker label is not obtained, and only voice thereof is obtained.

Figure 6:
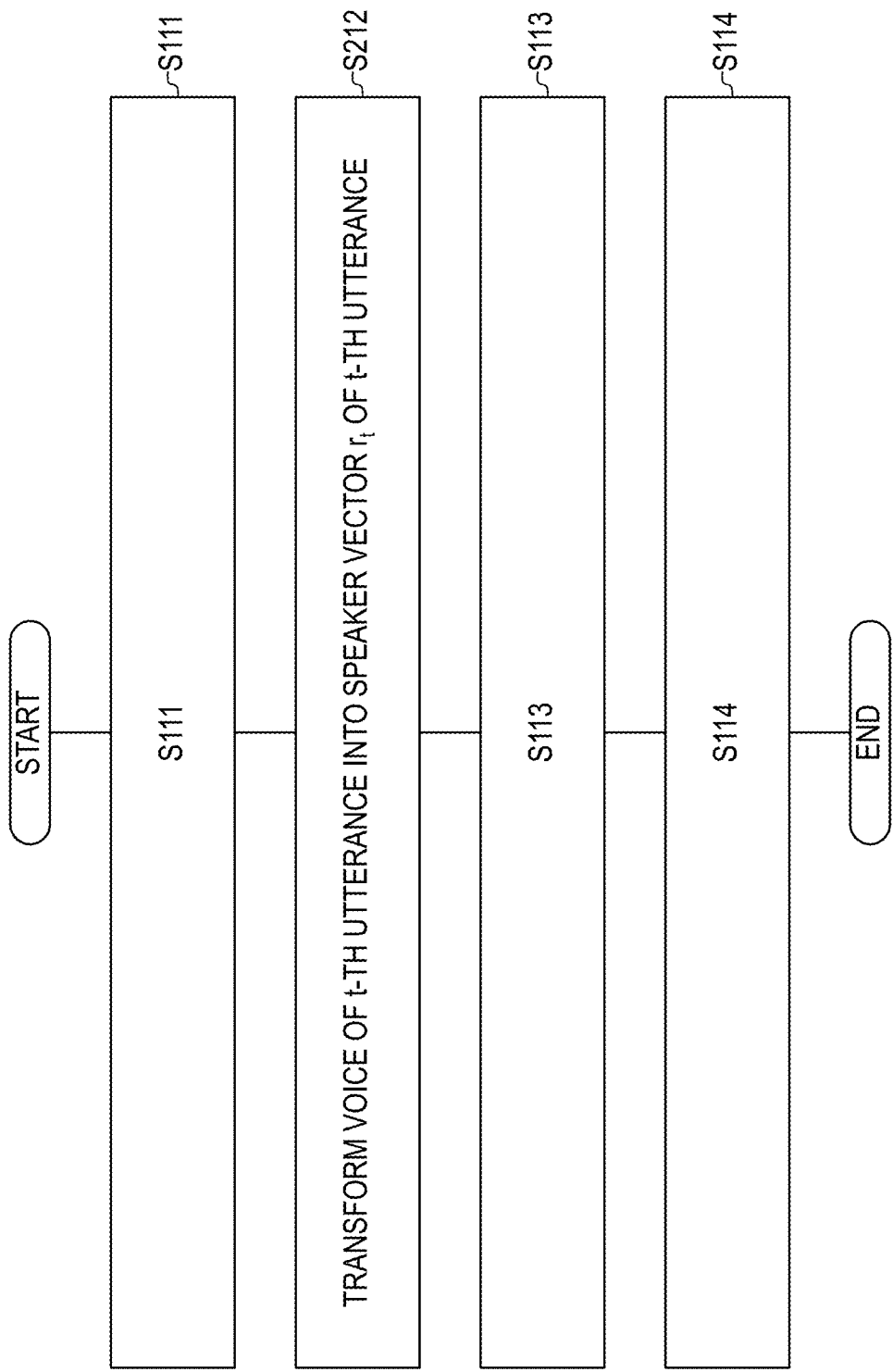
FIG. 6 is a flowchart showing operation of the tag estimation device according to the second embodiment.

Operation of the speaker vector construction unit 212 different from the first embodiment will be described with reference to FIG. 6.

[Speaker Vector Construction Unit 212]

Input: voice of a t-th utterance

Output: a speaker vector $r_t$ of the t-th utterance

Operation: The speaker vector construction unit 212 transforms the voice of the t-th utterance into the speaker vector $r_t$ of the t-th utterance (S212). The speaker vector construction unit 212 can use an arbitrary method (e.g., an end-to-end model) as long as the method extracts a vector representing speaker information from voice. The speaker vector construction unit 212 can use, for example, a method for extracting a vector for use in speaker identification, such as an i-vector. Since an i-vector is publicly known, a description thereof will be omitted.

<Model Parameter Learning Device 12>
[Model Parameter Estimation Unit 121]

In the present embodiment, input to and operation of a model parameter estimation unit 121 of a model parameter learning device 12 are changed in the manner below.

Input: N sets of utterance sequences (sequences as word sequences and voice sequences) and label sequences Operation: The model parameter estimation unit 121 determines a model parameter of the tagging unit 114 (and optionally model parameters of the utterance word feature vector transform unit 111, the speaker vector construction unit 212, and the utterance sequence information vector generation unit 113) from the N sets of utterance sequences (sequences as word sequences and voice sequences) and label sequences.

Third Embodiment

A configuration of a tag estimation device according to a third embodiment using an utterance content vector construction unit which directly constructs a vector representing utterance content from voice instead of the utterance word feature vector transform unit described earlier will be described below with reference to FIG. 7. As shown in FIG. 7, a tag estimation device 31 includes an utterance content vector construction unit 311, a speaker vector transform unit 112, an utterance sequence information vector generation unit 113, a vector storage unit 113A, and a tagging unit 114 and is the same in configuration as in the first embodiment except for the utterance content vector construction unit 311. The tag estimation device 31 according to the present embodiment can estimate a tag, as in the first embodiment, even if a word sequence of an utterance is not obtained, and only voice thereof is obtained.

Figure 8:
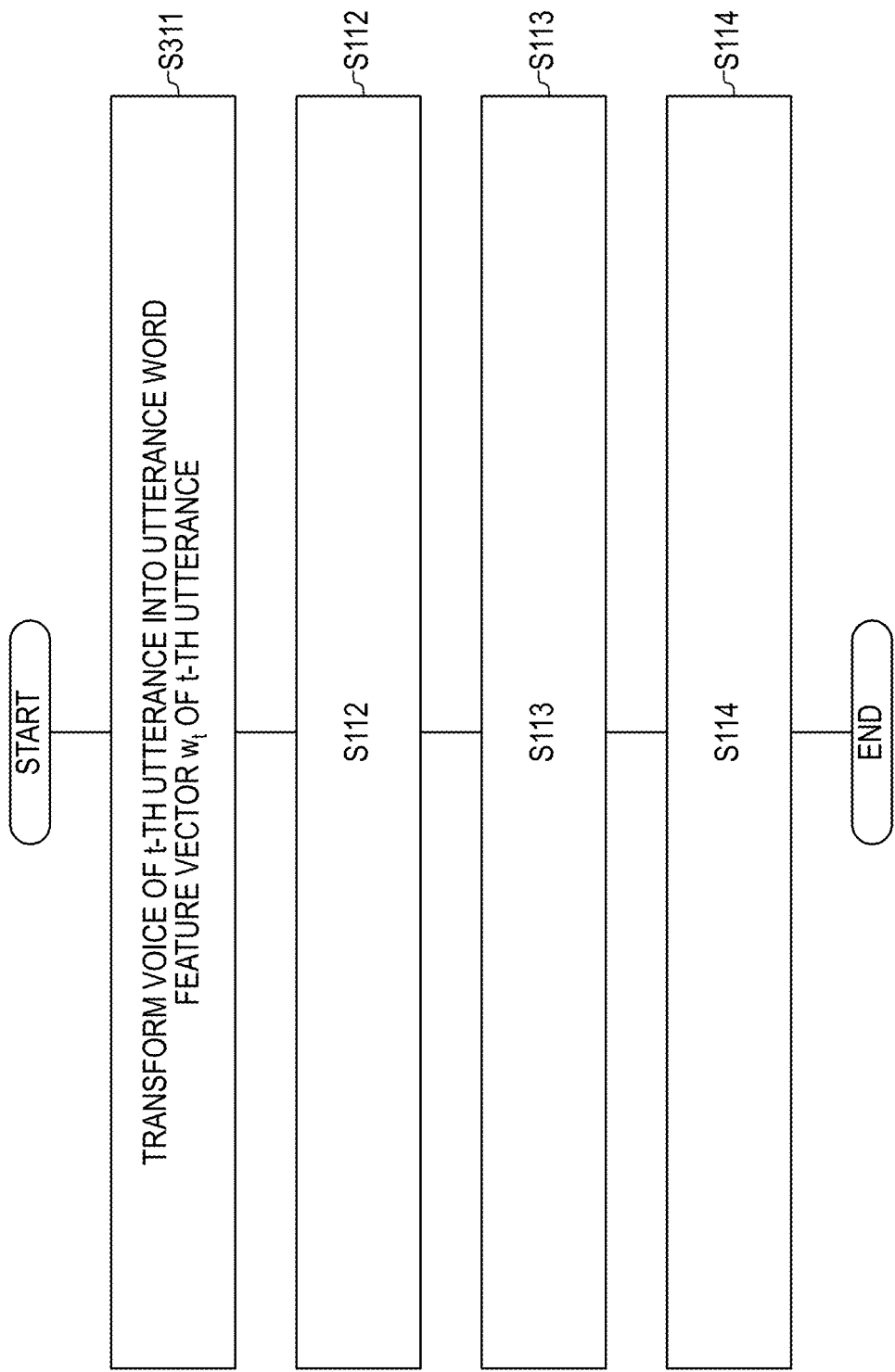
FIG. 8 is a flowchart showing operation of the tag estimation device according to the third embodiment.

Operation of the utterance content vector construction unit 311 different from the first embodiment will be described with reference to FIG. 8.

[Utterance Content Vector Construction Unit 311]

Input: voice of a t-th utterance

Output: an utterance word feature vector $w_t$ of the t-th utterance

Operation: The utterance content vector construction unit 311 transforms the voice of the t-th utterance into the utterance word feature vector $w_t$ of the t-th utterance (S311). The utterance content vector construction unit 311 can use an arbitrary method as long as the method extracts a vector representing utterance content from voice. The utterance content vector construction unit 311 can use a method for extracting a vector for use in voice recognition, such as a mean vector of mel-cepstral coefficients. Since a mel-cepstral coefficient is publicly known, a description thereof will be omitted.

<Model Parameter Learning Device 12>
[Model Parameter Estimation Unit 121]

In the present embodiment, input to and operation of a model parameter estimation unit 121 of a model parameter learning device 12 are changed in the manner below.

Input: N sets of utterance sequences (voice sequences and speaker label sequences) and label sequences Operation: The model parameter estimation unit 121 determines a model parameter of the tagging unit 114 (and optionally model parameters of the utterance content vector construction unit 311, the speaker vector transform unit 112, and the utterance sequence information vector generation unit 113) from the N sets of utterance sequences (voice sequences and speaker label sequences) and label sequences.

Fourth Embodiment

A configuration of a tag estimation device according to a fourth embodiment simultaneously using the speaker vector construction unit 212 according to the second embodiment that is a substitute for the speaker vector transform unit 112 described earlier, and the utterance content vector construction unit 311 according to the third embodiment that is a substitute for the utterance word feature vector transform unit 111 described earlier will be described below with reference to FIG. 9. As shown in FIG. 9, a tag estimation device 41 includes an utterance content vector construction unit 311, a speaker vector construction unit 212, an utterance sequence information vector generation unit 113, a vector storage unit 113A, and a tagging unit 114.

Since the components of the tag estimation device 41 according to the present embodiment operate in the same manner as those denoted by the same reference numerals of the tag estimation devices 11 to 31 according to the first to third embodiments, a description of operation of the components will be omitted.

<Model Parameter Learning Device 12>
[Model Parameter Estimation Unit 121]

In the present embodiment, input to and operation of a model parameter estimation unit 121 of a model parameter learning device 12 are changed in the manner below.

Input: N sets of utterance sequences (voice sequences) and label sequences

Operation: The model parameter estimation unit 121 determines a model parameter of the tagging unit 114 (and optionally model parameters of the utterance content vector construction unit 311, the speaker vector construction unit 212, and the utterance sequence information vector generation unit 113) from the N sets of utterance sequences (voice sequences) and label sequences.

A tag estimation device and a tag estimation method according to the embodiments are capable of implementing tagging with interaction information of a multiple persons conversation in mind. Specifically, at the time of estimation of a tag for a current utterance, tagging can be implemented with word information and speaker information of the current utterance and word information and speaker information of an utterance prior to the present in mind. This makes it possible to make tagging performance higher than in conventional techniques.

<Supplement>

A device according to the present invention as a single hardware entity has, for example, an input unit to which a keyboard or the like can be connected, an output unit to which a liquid crystal display or the like can be connected, a communication unit to which a communication device (e.g., a communication cable) capable of communicating with an outside of the hardware entity can be connected, a CPU (which stands for Central Processing Unit and may include a cache memory, a register, and the like), a RAM and a ROM which are memories, an external storage device which is a hard disk, and a bus which makes connections so as to allow data exchange among the input unit, the output unit, the communication unit, the CPU, the RAM, the ROM, and the external storage device. A device (drive) capable of reading from and writing to a recording medium, such as a CD-ROM, or the like may be provided in the hardware entity as needed. Physical substances provided with such hardware resources include a general-purpose computer.

A program required to implement the above-described capabilities, data required in processing of the program, and the like are stored in the external storage device for the hardware entity (the program may be stored in not only the external storage device but also, for example, a ROM which is a read-only storage device). Data and the like obtained through the processing of the program are appropriately stored in the RAM, the external storage device, and the like.

In the hardware entity, each program stored in the external storage device (or the ROM or the like) and data required in processing of the program are loaded into a memory as needed and are appropriately interpreted, executed, and processed by the CPU. As a result, the CPU implements a predetermined capability (each component represented above as a "* unit," "* means," or the like).

The present invention is not limited to the above-described embodiments and can be appropriately changed without departing from the spirit of the present invention. The processes described in the embodiments are not always executed in chronological order in order of description and may be executed in parallel or individually in accordance with processing performance of a device which is to execute processing or as needed.

As described above, if processing capabilities in a hardware entity (a device according to the present invention) described in the embodiments are implemented by a computer, processing details of capabilities which the hardware entity needs to have are described in a program. With execution of the program by the computer, the processing capabilities in the hardware entity are implemented on the computer.

The program describing the processing details can be recorded on a computer-readable recording medium. As the computer-readable recording medium, anything, such as a magnetic recording device, an optical disc, a magneto-optical recording medium, or a semiconductor memory, may be adopted. Specifically, for example, a hard disk device, a flexible disk, a magnetic tape, or the like can be used as a magnetic recording device, a DVD (Digital Versatile Disc), a DVD-RAM (Random Access Memory), a CD-ROM (Compact Disc Read Only Memory), a CD-R/RW (Recordable/ReWritable), or the like can be used as an optical disc, an MO (Magneto-Optical disc) or the like can be used as a magneto-optical recording medium, and an EEP-ROM (Electronically Erasable and Programmable-Read Only Memory) or the like can be used as a semiconductor memory.

Distribution of the program is performed by, for example, selling, giving, or renting a portable recording medium, such as a DVD or a CD-ROM, having the program recorded thereon. Additionally, a configuration in which the program is stored in a storage device of a server computer and is distributed through transfer of the program from the server computer to another computer over a network may be adopted.

For example, a computer which executes a program as described above first temporarily stores a program recorded on a portable recording medium or a program transferred from a server computer in its storage device. At the time of execution of processing, the computer reads the program stored in its recording medium and executes processing in accordance with the read program. As another form of execution of the program, the computer may directly read the program from a portable recording medium and execute processing in accordance with the program. Alternatively, each time a program is transferred from the server computer to the computer, the computer may successively execute processing in accordance with the received program. A configuration in which the above-described processing is executed by a so-called ASP (Application Service Provider) service which does not perform transfer of the program from the server computer to the computer and implements processing capabilities only by giving an instruction for execution and acquiring a result may be adopted. Note that programs according to the present form are assumed to include information made available for processing by an electronic computer which is equivalent to a program (e.g., data which is not a direct instruction to a computer but has the property of prescribing processing of the computer).

Additionally, in this form, a hardware entity is constructed through execution of a predetermined program on a computer. However, at least a part of the processing details may be implemented by means of hardware.

The invention claimed is:

1. A tag estimation device comprising:
a hardware processor that:
generates, by a model, based on an input, a first utterance sequence information of an utterance in a sequence of utterances in a dialogue, wherein
  the input comprises a combined utterance information of the utterance and a second utterance sequence information,
  the combined utterance information of the utterance comprises added pieces of utterance word feature information of the utterance and speaker information of the utterance,
  the second utterance sequence information comprises recursively added pieces of utterance word feature information of respective utterances in the sequence of utterances up to an immediately preceding utterance of the utterance in the sequence of utterances and pieces of speaker information of the respective utterances in the sequence of utterances up to the immediately preceding utterance of the utterance in the sequence of utterances,
  the first utterance sequence information thereby represents recursively added pieces of utterance information of utterances up to the utterance in the sequence of utterances in the dialogue,
  the utterance word feature information is associated with at least a word in the utterance spoken by a speaker, and
  the speaker information of the utterance is associated with the speaker; and
determines a tag associated with the utterance, wherein the tag represents a result of analyzing the utterance from a predetermined model parameter and the first utterance sequence information.

2. The tag estimation device according to claim 1, comprising:
the hardware processor that:
transforms a word sequence of the utterance into the utterance word feature information of the utterance in the sequence of utterances; and
transforms a speaker label of the utterance into the speaker information of the utterance in the sequence of utterances.

3. The tag estimation device according to claim 1, comprising:
the hardware processor that:

transforms a word sequence of the utterance into the utterance word feature information of the utterance; and transforms voice of the utterance into the speaker information of the utterance.

4. The tag estimation device according to claim 1, comprising:

the hardware processor that:

transforms voice of the utterance into the utterance word feature information of the utterance; and transforms a speaker label of the utterance into the speaker information of the utterance.

5. The tag estimation device according to claim 1, comprising:

the hardware processor that:

transforms voice of the utterance into the utterance word feature information of the utterance; and transforms the voice of a frame utterance of the utterance into the speaker information of the utterance.

6. The tag estimation device according to claim 1, wherein the tag comprises at least one of utterance scenes, an utterance type, an emotion of an utterance utterer, or utterance paralinguistic information.

7. The tag estimation device according to claim 1, wherein the hardware processor uses an estimation model that is learned on a basis of teacher data including a set of the sequence of utterances and a sequence of labels that are correct tags corresponding to the sequence of utterances.

8. A non-transitory computer-readable storage medium storing a program for causing a computer to function as a tag estimation device according to claim 1.

9. A tag estimation method to be executed by a tag estimation device, comprising:

generating, by a model, based on an input, a first utterance sequence information of an utterance in a sequence of utterances in a dialogue, wherein the input comprises a combined utterance information of the utterance and a second utterance sequence information, the combined utterance information of the utterance comprises added pieces of utterance word feature information of the utterance and speaker information of the utterance, the second utterance sequence information comprises recursively added pieces of utterance word feature information of respective utterances in the sequence of utterances up to an immediately preceding utterance of the utterance in the sequence of utterances and speaker information of the respective utterances in the sequence of utterances up to the utterance in the sequence of utterances, the first utterance sequence information thereby represents recursively added pieces of utterance information of utterances up to the utterance in the sequence of utterances in the dialogue, the utterance word feature information is associated with at least a word in the utterance spoken by a speaker, and the speaker information of the utterance is associated with the speaker; and determining a tag associated with the utterance, wherein the tag represents a result of analyzing the utterance from a predetermined model parameter and the first utterance sequence information, wherein the tag specifies a scene of the dialogue.

* * * * *